(12) United States Patent
Tanaka

(10) Patent No.: US 6,248,283 B1
(45) Date of Patent: Jun. 19, 2001

(54) METHOD FOR RE-USING EXPANDED STYRENE

(75) Inventor: Syuzo Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/287,316

(22) Filed: Apr. 7, 1999

(30) Foreign Application Priority Data

Apr. 15, 1998 (JP) .................................................. 10-105028

(51) Int. Cl.$^7$ .................................................. B29C 45/00
(52) U.S. Cl. .......................... 264/413; 264/321; 264/492; 264/916; 264/921
(58) Field of Search .................................... 264/413, 492, 264/321, 916, 921

(56) References Cited

U.S. PATENT DOCUMENTS 3,607,999 * 9/1971 Corbett et al. ........................ 264/321
3,752,631 * 8/1973 Corbett et al. ...................... 425/324.1
5,147,894 * 9/1992 Bopp et al. .......................... 521/40.5
5,310,513 * 5/1994 Yamamoto et al. .

* cited by examiner

Primary Examiner—Allan R. Kuhns
(74) Attorney, Agent, or Firm—Sonnenschein, Nath & Rosenthal

(57) ABSTRACT

A method for re-using unneeded expanded styrene and an apparatus for preparing comminuted expanded styrene that can be used as a starting material for injection molding. The expanded styrene is rendered re-usable through a first step of comminuting expanded styrene, a second step of illuminating far-infra-red light to the expanded styrene comminuted by the first step to reduce its volume, a third step of further comminuting expanded styrene, reduced in volume by the second step, to prepare a granulated material, and a fourth step of injection-molding the granulated material from the third step to prepare a regenerated article.

4 Claims, 4 Drawing Sheets

METHOD FOR RE-USING EXPANDED STYRENE

RELATED APPLICATION DATA

The present application claims priority to Japanese Application No. P10-105028 filed Apr. 15, 1998 which application is incorporated herein by reference to the extent permitted by law.

BACKGROUND OF THE INVENTION

1. Field of the Invention

This invention relates to a method for re-using expanded styrene by processing used expanded styrene to fabricate regenerated products, and an apparatus used in this method for processing expanded styrene.

2. Description of the Related Art

Expanded styrene is superior in shock-absorption, heat-insulating and heat retaining properties, and hence is used extensively for packaging a wide variety of products from electric appliances to food and beverages.

However, this expanded styrene has a drawback that it presents disposal difficulties when the articles are unpacked and the packaging material is to be discarded. That is, expanded styrene, which has become unnecessary, was simply destroyed or incinerated. However, this disposal system is now to be re-considered because of the problems of procurement of land-filling sites and public hazards caused by bad smell or smoke generated on incineration.

In order to meet this request, there has been proposed a processing apparatus for expanded styrene such as is disclosed in Japanese Laying-Open Patent H-1-89110 or in Japanese Laying-Open Patent H-6-166034. The processing apparatus pulverizes the unneeded expanded styrene, transports the pulverized product on a belt conveyor and illuminates far-ultra-red light from a far-ultra-red heater provided partway on the transport path to reduce its volume. If the far-ultra-red light is illuminated to heat the pulverized product of the expanded styrene, as in this processing apparatus for the expanded styrene, the used styrene can be reduced in its volume without causing fusion decomposition or bad smell or elevating the furnace temperature. Thus, the processing apparatus for expanded styrene is meritorious in handling the unneeded expanded styrene as a waste material.

However, if the expanded styrene is processed using the above-described processing apparatus, the aforementioned problem cannot be solved completely because the expanded styrene, reduced in its volume on pulverization, is handled as a waste material.

It is therefore desired to re-use the pulverized expanded styrene, thus reduced in its volume, as a starting material for producing a regenerated product. However, the pulverized expanded styrene, thus reduced in its volume, is not uniform in size and shape, such that it cannot be used as a starting material for injection molding.

SUMMARY OF THE INVENTION

It is therefore an object of the present invention to provide a method for reusing unneeded used expanded styrene and a processing apparatus for expanded styrene for producing pulverized expanded styrene.

In one aspect, the present invention provides a method for re-using expanded styrene including a first step of comminuting expanded styrene, a second step of illuminating far-infra-red light to the expanded styrene comminuted by the first step to reduce the volume thereof, a third step of further comminuting expanded styrene, reduced in volume by the second step, to prepare a granulated material and a fourth step of injection-molding the granulated material from the third step to prepare a regenerated article.

In this re-using method for expanded styrene, unneeded expanded styrene is first-order comminuted in the first step to a pre-set size. The expanded styrene, first-order comminuted in the first step, is illuminated by far-infra-red light in the second step and thereby reduced in volume.

The expanded styrene, reduced in volume by the second step, is second-order comminuted in the third step to a granulated material having uniform size and shape. The granulated material from the third step is injection-molded in the fourth step to produce a regenerated article. This enables the unneeded expanded styrene to be re-used as a starting material for a regenerated article.

In another aspect, the present invention provides an apparatus for processing expanded styrene including first comminuting means for first-order comminuting charged expanded styrene, heating means for heating and reducing the volume of the expanded styrene first-order comminuted by the first comminuting means by illuminating the far-infra-red light thereon and second comminuting means for first-order comminuting the expanded styrene reduced in volume by the heating means to prepare a granulated material.

The first comminuting means first-order comminutes the unneeded expanded styrene to a pre-set size. The expanded styrene, first-order comminuted by the first comminuting means, is routed to the heating means.

The heating means illuminates the far-infra-red light on the expanded styrene, first-order comminuted by the first comminuting means, to heat the expanded styrene to reduce its volume. The expanded styrene, reduced in volume by this heating means, is sent to the second comminuting means.

The second comminuting means second-order comminutes the expanded styrene, first-order comminuted by the heating means, to render the expanded styrene uniform in size and shape to prepare a granulated starting material.

The granulated starting material, prepared by this processing apparatus for expanded styrene, is charged into, for example, an injection molding machine so as to be used as a starting material for a regenerated article as the product of the injection molding machine.

In the re-using method for the expanded styrene according to the present invention, unneeded expanded styrene is comminuted in the first step to the comminuted expanded styrene which is illuminated in the second step by the far-infra-red light and thereby reduced in volume. The expanded styrene, thus reduced in volume, is further comminuted in the third step to give a granulated starting material which is injection-molded in the fourth step to produce a regenerated article. Thus, the unneeded expanded styrene can be re-used without producing pollution problems attributable to increased volume of industrial wastes and disposal thereof on incineration.

Moreover, the processing apparatus for expanded styrene according to the present invention is configured for first-order comminuting unneeded expanded styrene by the first comminution means, illuminating the far-infra-red light by heating means to reduce its volume and second-order comminuting the material reduced in volume by second-order comminuting means to prepare the granulated starting material. This gives a re-usable starting material uniform in size and shape.

Therefore, if the unneeded expanded styrene is processed using the processing apparatus for expanded styrene according to the present invention, the expanded styrene, which is not needed, can be used as a starting material for a regenerated article, without handling the unneeded expanded styrene as a waste material, thus completely eliminating the pollution of other problems attributable to increased volume of the industrial wastes or disposal thereof on incineration.

Moreover, since the present processing apparatus for expanded styrene illuminates the far-infra-red light on the unneeded expanded styrene for reducing its volume without causing decomposition on fusion, it is possible to prevent bad smell or smoke of combustion attributable to decomposition on fusion of the expanded styrene.

DESCRIPTION OF THE PREFERRED EMBODIMENTS

Figure 1:
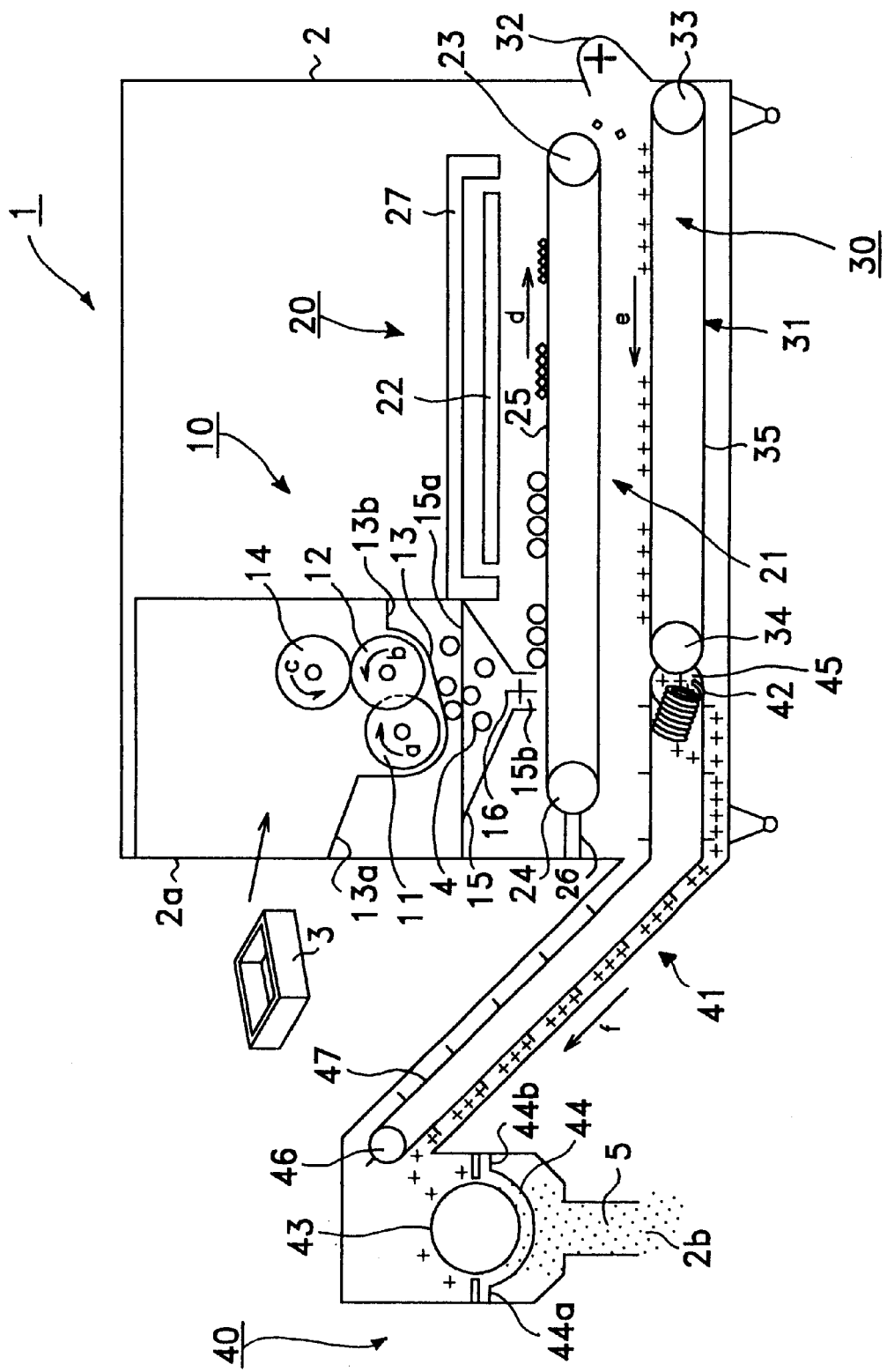
FIG. 1 is a schematic view showing a unitary type processing apparatus for expanded styrene according to the present invention.

Referring to the drawings, preferred embodiments of the present invention will be explained in detail.

The preset processing apparatus for expanded styrene consecutively performs a series of operations consisting in finely comminuting unneeded expanded styrene, used up for packaging commercial products, illuminating far-infra-red light on the comminuted expanded styrene to reduce its volume and further comminuting the comminuted product to render its size and shape thereof uniform.

A processing apparatus 1 for expanded styrene of an unitary structure, having various units for performing these re respective steps, is first explained. Referring to FIG. 1, this unitary type processing apparatus 1 includes a first-order comminuting unit 10, for comminuting expanded styrene 3 injected into a main body unit 2 of the apparatus, a heating unit 20 for heating the first-order comminuted expanded styrene, referred to hereinafter as first-order comminuted article 4, by illuminating far-infra-red light thereto, a cooing unit 30 for cooling the first-order comminuted article 4, reduced in its volume by heating, and a second-order comminuting unit 40 for further comminuting the cooled first-order comminuted article 4 to produce granulated product having uniform size and shape, referred to hereinafter as second-order comminuted article 5. These units are enclosed within the main body unit 2 of the apparatus 1.

The first-order comminuting unit 10 includes a pair of comminuting rolls 11, 12 as means for comminuting the expanded styrene 3 injected into the main body unit 2 of the apparatus via an injection port 2a provided in the main body unit 2, and a first filter 13 for sorting the first-order comminuted article 4 comminuted by the paired comminuting rolls 11, 12 to permit only the first-order comminuted article 4 of a size not larger than a pre-set size to pass therethrough, and a scraper roll 14 for scraping the first-order comminuted article 4 not reduced to a size not larger than the pre-set size to inject the scraped first-order comminuted article 4 into a space between the paired comminuting rolls 11, 12. The first-order comminuting unit 10 also includes a gate 15 for quantitatively supplying the first-order comminuted article 4 selected by the first filter 13 to the heating unit 20, and a paddler 16 for stirring the first-order comminuted article 4 in the gate 15 so that the first-order comminuted article 4 transmitted through the first filter 13 will not be accumulated at the gate 15.

Figure 2:
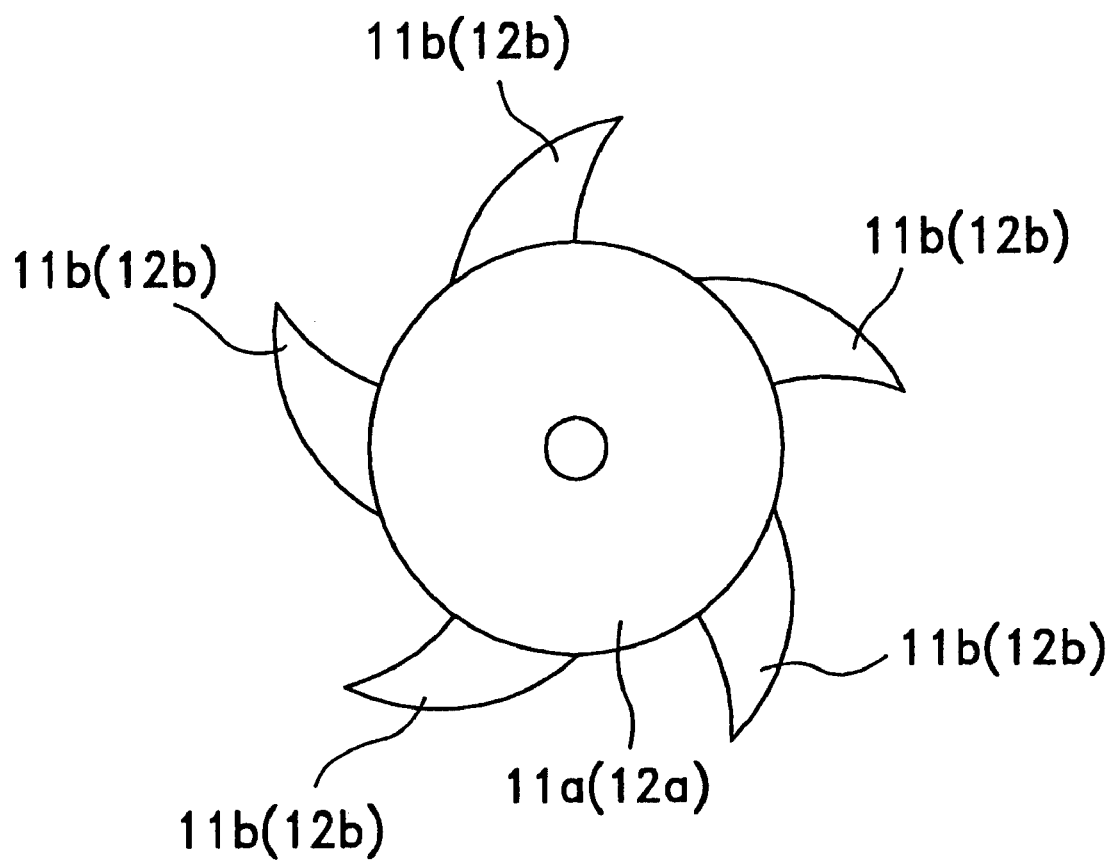
FIG. 2 is a side view of a pulverizing roll.

Referring to FIG. 2, the paired comminuting rolls 11, 12 include plural wavefront-shaped cutting edges 11b, 12b, provided at pre-set intervals on the peripheral surfaces of the columnar-shaped rolls 11a, 12a. The comminuting rolls 11, 12 are provided in the vicinity of the injection port 2a in the main body unit 2 parallel to and at a pre-set spacing from each other so that the cutting edges 11b, 12b mesh each other. The comminuting rolls 11, 12 are adapted for being rotated in reverse direction to each other, as indicated by arrows a and b in FIG. 1, to crush the expanded styrene 3 charged therebetween to a comminuted product of an indefinite shape and a size not larger than a pre-set value.

Adjacent to the comminuting roll 12 is arranged a scraper roll 14 adapted to be rotated in the direction indicated by arrow c in FIG. 1. This scraper roll 14 scrapes the first-order comminuted article 4 not reduced to the size not larger than the pre-set size to inject this first-order comminuted article 4 to a space between the paired comminuting rolls 11, 12. These comminuting rolls 11, 12 and the scraper roll 14 are run in rotation by a driving motor, not shown.

The first filter 13 is configured as a metal plate having plural circular orifices approximately 20 to 30 mm in diameter, although these orifices are not shown. This first filter 13 has its center portion molded to a curvilinear shape surrounding the paired comminuting rolls 11, 12. The first filter 13 is arranged below the comminuting rolls 11, 12, by having both ends 13a, 13b thereof secured to the inner wall section of the main body unit 1.

This first filter 13 sorts the first-order comminuted article 4 by allowing the first-order comminuted article 4 from the comminuting rolls 11, 12 of the size not larger than the size ofthe orifices to pass through these orifices, while not allowing the first-order comminuted article 4 of the size larger than the orifice diameter to pass through the orifices. The first-order comminuted article 4 passed through the first filter 13 is supplied to the gate 15, while the first-order comminuted article 4 not passed through the first filter 13 is scraped by the scraper roll 14 so as to be again injected into the space between the paired comminuting rolls 11, 12.

The gate 15 is funnel-shaped and is arranged below the first filter 13 so that its upper end opening 15a faces the first filter 13. The gate 15 has its lower opening 15b smaller in diameter than the upper side opening 15a so that the first-order comminuted article 4 injected at the upper end opening 15a is temporarily accumulated between these openings 15a, 15b and so that the first-order comminuted article 4 is discharged quantitatively via the lower end opening 15b to moderate the amount of supply of the first-order comminuted article 4 to the heating unit 20.

On the lower end of the gate 15 is mounted the paddler 16 which is comprised of a rotary shaft to which is mounted a flat-plate-shaped rotary plate. This rotary plate is run in rotation with rotation of the rotary shaft to stir the first-order comminuted article 4 to permit the first-order comminuted article 4 to be supplied appropriately to the heating unit 20 without being accumulated in the gate 15.

The heating unit 20 includes a first conveyor 21 for transporting the first-order comminuted article 4 supplied from the first-order comminuting unit 10, and a far-infra-red heater 22 for illuminating the far infra-red light to the first-order comminuted article 4 transported by the first conveyor 21 to heat and reduce the volume of the first-order comminuted article 4.

The first conveyor 21 includes a pair of driving rolls 23, 24, rotatably arranged in the main body unit 2, and a belt 25 of glass fibers placed on these driving rolls 23, 24. The first conveyor 21 is adapted to receive the first-order comminuted article 4 descending from the gate 15 of the first-order comminuting unit 10 to transport the received article to the cooling unit 30.

The belt 25 is adapted for being moved via e.g., a chain at a pre-set velocity in the direction indicated by arrow d by a driving motor, not shown. The speed of movement of the belt 25 is variable in a range from 0.5 to 10.5 m/min and can be set to an optimum velocity depending on the sort or the state of the expanded styrene 3 charged into the main body unit 2. The belt 25 is processed on the glass fiber surface with Teflon containing carbon for electric conduction.

On the more inchoate side of the first conveyor 21 than the point of reception of the first-order comminuted article 4, there is mounted a flat-plate-shaped scraper 26 so that its foremost part abuts on the belt 25. This scraper 26 scrapes off the material deposited on the belt 25.

The far-infra-red heater 22 has plural heat-radiating plates, generating far-infra-red light, so that its longitudinal direction extends parallel to the running direction of ghe belt 25. In the present embodiment, four rows of heat radiating plates, each having a capacity of 2.0 kW, are arrayed to constitute the far-infra-red heater 22. This far-infra-red heater 22 is mounted at a pre-set separation from the transporting surface of the belt 25 and has a length sufficient to reduce the volume of the first-order comminuted article 4 transported by the first conveyor 21 reliably until the time the first-order comminuted article 4 reaches the cooling unit 30. This far-infra-red heater 22 illuminates the far-infra-red light on the first-order comminuted article 4 to heat the first-order comminuted article 4 to a temperature not less than its softening point and less than its fusion point. This allows the first-order comminuted article 4 to be reduced in volume without producing bad smell or smoke of combustion and without inducing decomposition on fusion.

The perimetral portion of the far-infra-red heater 22, except its surface facing the belt 25, is surrounded by an insulating material 27 to improve the hest utilization efficiency.

The first-order comminuted article 4, heated by the heating unit 20 and thereby reduced in its volume, is routed to the closure member 30.

The closure member 30 includes a second conveyor 31, for transporting the first-order comminuted article 4 illuminated by the infra-red light by the far-infra-red heater 22 and thereby reduced in volume, as the first-order comminuted article 4 is allowed to cool, and a cooling fan 32 for sending cooling air to the first-order comminuted article 4 transported by the second conveyor 31 to promote heat dissipation form the first-order comminuted article 4.

Similarly to the first conveyor 21, the second conveyor 31 is provided with a pair of driving rolls 33, 34, rotatably mounted within the main body unit 2, and a belt 35 of polyurethane rubber, placed on these driving rolls 33, 34. This second conveyor 31 is arranged below the first conveyor 21 and accepts the first-order comminuted article 4 descending from the trailing end of the first conveyor 21 to transport the first-order comminuted article 4 under cooling.

Similarly to the belt 25 of the first conveyor 21, the belt 35 is adapted to be moved via e.g., a chain by a driving motor, not shown, in the direction indicated by arrow e in the drawing, at a movement velocity of, for example, 2 m/min. The first-order comminuted article 4, transported by the second conveyor 31, is set on the belt 35, and is moved at a movement velocity of, for example, 2 m/min, as it is cooled by the cooling air from the cooling fan 32, so that the first-order comminuted article 4 is gradually cooled until it reaches the second-order comminuting unit 40.

The cooling fan 32 is a so-called cross-flow fan having a unitary structure with the motor and, by rotation of an air-blowing drum mounted on a motor rotary shaft, the cooling air is supplied to the first-order comminuted article 4 transported by the second conveyor 31 to promote heat radiation from the first-order comminuted article 4.

The first-order comminuted article 4, transported by the second conveyor 31 and cooled, is supplied to the second-order comminuting unit 40.

The second-order comminuting unit 40 includes an inclined conveyor 41, for uplifting the first-order comminuted article 4 cooled by the closure member 30, a coil conveyor 42 for transferring the first-order comminuted article 4, transported by the second conveyor 32 of the closure member 30, onto the inclined conveyor 41, and a comminuting roll 43 for further comminuting the first-order comminuted article 4 uplifted by the inclined conveyor 41. The second-order comminuting unit 40 also includes a second filter 44 for sorting the second-order comminuted article 5 comminuted by the comminuting roll 43 to permit only the second-order comminuted article 5 not larger than a pre-set size to be passed therethrough.

The inclined conveyor 41 is made up of a first driving roll 45, adjacent to the driving roll 34 for the second conveyor 31, a second driving roll 46 mounted at a higher position than the first driving roll 45, and a belt 47 in the form of a catapillar 47 placed on the first and second rolls 45, 46. There are mounted on the belt 47 plural uplifting pieces 47a for uplifting the first-order comminuted article 4 at a pre-set interval. This belt 47 is adapted to be moved by a driving motor, not shown, at a pre-set velocity, in the direction indicated by arrow f, whereby the first-order comminuted article 4 supplied to the inclined conveyor 41 is uplifted by the uplifting pieces 47a to a pre-set height.

The coil conveyor 42 is coil-shaped and has its one end positioned below the trailing end of the second conveyor 31, while having its other end positioned below the inchoate end of the inclined conveyor 41. This coil conveyor 42 is adapted to be run in rotation by a driving motor not shown. This coil conveyor 42 is driven to transport the first-order comminuted article 4 descending from the trailing end of the second conveyor 31 to the inchoate end of the inclined conveyor 41.

The comminuting roll 43 is arranged within the main body unit 2 at a position below the trailing end of the inclined conveyor 41 for further comminuting the first-order comminuted article 4 uplifted to a pre-set height by the inclined conveyor 4.

The comminuting roll 43 has a sole rotary blade and two fixed blades arranged on both sides of the rotary blade and is run in rotation by a driving motor, not shown, via a V-belt for example, to crush the first-order comminuted article 4 descending from the trailing end of the inclined conveyor 41 to produce granulated second-order comminuted article 5.

The second filter 44 is formed by, for example, a metal plate, having plural circular-shaped orifices, not shown, approximately 7 mm in diameter. This second filter 44, arranged below the comminuting roll 43, has its center portion molded to a curvilinear shape to surround the comminuting roll 43, while having its both ends secured to the inner wall surface of the main body unit 2.

This second filter 44 allows the second-order comminuted article 5 from the comminuting roll 43, having the diameter less than the orifice diameter, to pass through the orifices, while not allowing the second-order comminuted article 5 of the diameter, larger than the orifice diameter, to pass through the orifices, to sort the second-order comminuted article 5.

The second-order comminuted article 5, passed through the second filter 44, is discharged to outside the main body unit 2 via a discharge port 2b provided in the main body unit 2. The granulated second-order comminuted article 5, discharged to outside, is used as a starting material for e.g., injection molding.

The operation of the processing apparatus 1 for expanded styrene, constructed as described above, is now explained.

First, the power source of the processing apparatus 1 is turned on, and unneeded expanded styrene 3 is charged into the main body unit 2 via the injection port 2a. The paired comminuting rolls 11, 12 operate for finely comminuting the expanded styrene 3.

The first-order comminuted article 4 from the paired comminuting rolls 11, 12, having a size not larger than the pre-set size, is transmitted through the first filter 13 so as to be extruded to the gate 15. For example, the first-order comminuted article 4 having the diameter not larger than 20 to 30 mm is passed through the filter 13 and extruded onto the gate 15.

The first-order comminuted article 4, extruded onto the gate 5, is agitated by the paddler 16, and supplied to the inchoate side of the first conveyor 21, moving at a constant velocity, at a constant feed rate. The first-order comminuted article 4 having a size larger than a pre-set value is scraped by the scraper roll 14 so as to be re-comminuted by the paired comminuting rolls 11, 12.

The first-order comminuted article 4 supplied to the first conveyor 21 is transported by the first conveyor 21 and irradiated with the far-infra-red light by the far-infra-red heater 22 arranged on the transporting channel. The first-order comminuted article 4, thus illuminated by the far-infra-red light, undergoes internal heating, so that its expanded space is destructed and hence the first-order comminuted article 4 starts to be contracted. This first-order comminuted article 4 undergoes volumetric contraction, without decomposition on fusion, until the time it reaches the trailing end of the first conveyor 21, so that the first-order comminuted article 4 is deformed in a coral shape.

The first-order comminuted article 4 deformed into the coral shape, descends from the trailing end of the first conveyor 21 and is thence supplied to the second conveyor 31 travelling at a constant rate. The first-order comminuted article 4, supplied to the second conveyor 31 is transported as it is cooled gradually by the second conveyor 31. The first-order comminuted article 4 transported by this second conveyor 31, is exposed to the cooling air flow from the cooling fan 32 so that its heat dissipation is promoted. Thus, the first-order comminuted article 4, at a temperature of the order of 120 to 130°, at the inchoate end of the second conveyor 31, is cooled to a temperature of the order of 40° C. at the trailing end of the second conveyor 31.

The first-order comminuted article 4, supplied to the inclined conveyor 41, is uplifted by the uplifting pieces 47a to a pre-set height. The first-order comminuted article 4, uplifted to the pre-set height, is further comminuted by the comminuting roll 43 into granulated second-order comminuted article 5.

The second-order comminuted article 5, comminuted by the comminuting roll 43 to a size not larger than the pre-set size, is passed through the second filter 44 to descend via the discharge port 2b to outside the main body unit 2. The second-order comminuted article 5, with the diameter of not larger than 7 mm, is discharged via the discharge port 2b to outside the main body unit 2.

Figure 3:
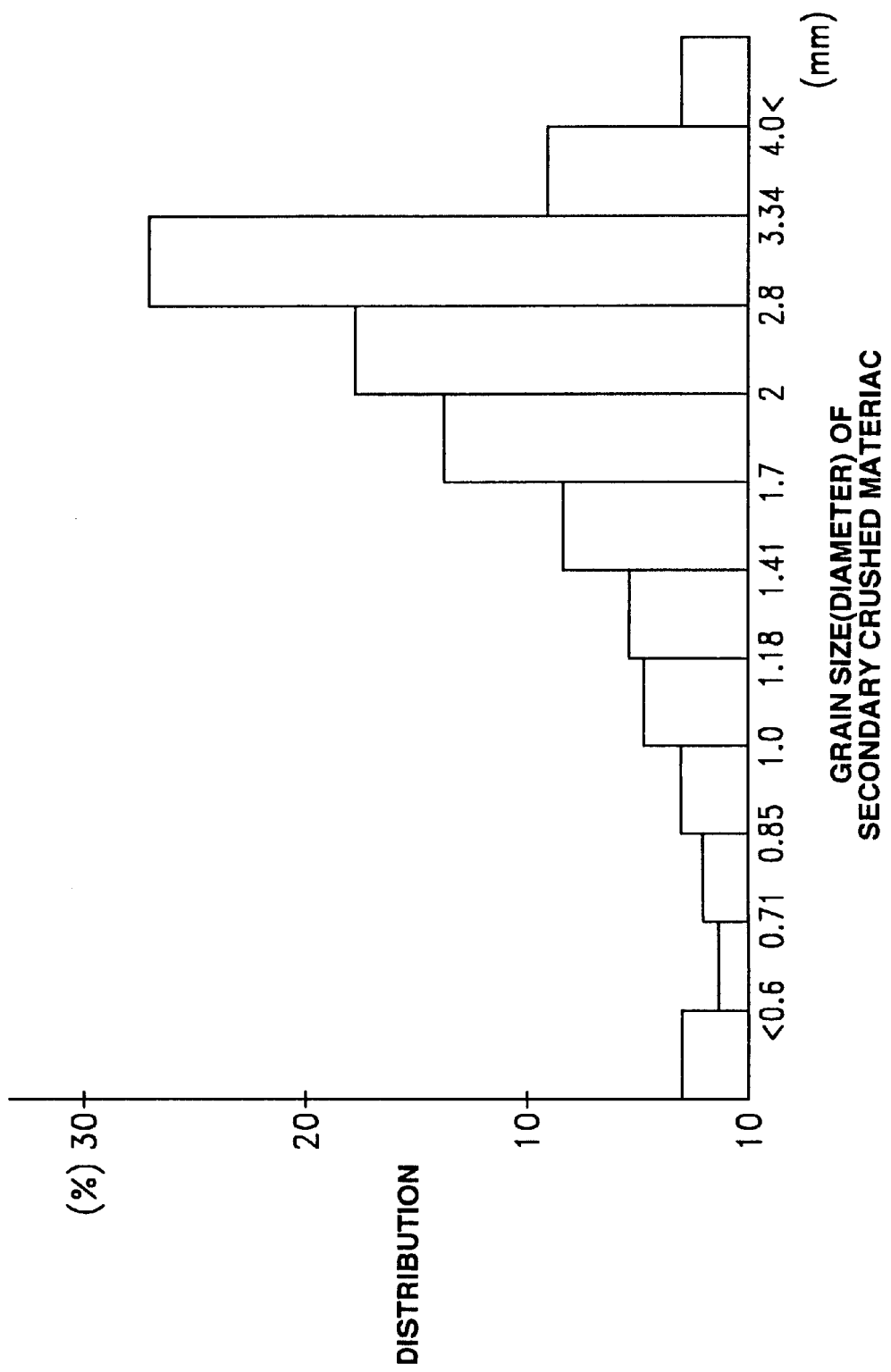
FIG. 3 shows the particle size distribution of a secondary pulverized product fabricated by the expanded styrene processing apparatus.

With the processing apparatus 1 for expanded styrene, the unneeded expanded styrene 3 is subjected to first-order comminution, followed by irradiation with the far-infra-red light for volume reduction and by second-order comminution in this order to prepare the granulated second-order comminuted article 5. The second-order comminuted article 5, prepared by the processing apparatus 1 for expanded styrene through the processes of first-order comminution, irradiation with far-infra-red light and second-order comminution, is averaged in size and shape to give a granulated article having the diameter mainly in a range from 2 to 3 mm, as shown in FIG. 3. FIG. 3 shows particle size distribution of the second-order comminuted article 5 in case the second filter 44 has the orifice diameter of the order of 7 mm. If the orifice diameter of the second filter 44 is modified, a second-order comminuted article can be obtained which has an averaged particle size different from that of the second-order comminuted article 5 shown in FIG. 2.

The second-order comminuted article 5, prepared by the processing apparatus 1 for expanded styrene according to the present invention, is charged into, for example, an injection molding machine, so as to be re-used as a starting material for injection molding.

The second-order comminuted article 5, prepared by the processing apparatus 1 for expanded styrene according to the present invention, is averaged in this manner in size and shape and hence can be re-used as a starting material for injection molding. If the starting material having variations in size and shape is used for injection molding, it may be an occurrence that the material is fused only insufficiently in the injection molding machine to cause malfunctions thereof or deterioration in the quality of the molded product. However, the second-order comminuted article 5 produced by the processing apparatus 1 for expanded styrene according to the present invention is granulated to a uniform size and shape and hence can be used satisfactorily as a starting material for injection molding without producing these inconveniences.

The second-order comminuted article 5 an also be mixed as an ingredient into the concrete or mortar mixture so as to be re-used a lightweight construction material.

A two-segment type processing apparatus for expanded styrene 50, made up of a first processor having a unit for comminuting unneeded expanded styrene and a unit for illuminating far-infra-red light on the first-order comminuted article, and a second processor having a cooling unit for cooling the first-order comminuted article, reduced in volume on heating, and a unit for further comminuting the first-order comminuted article to prepare the second-order comminuted article, is now explained.

Figure 4:
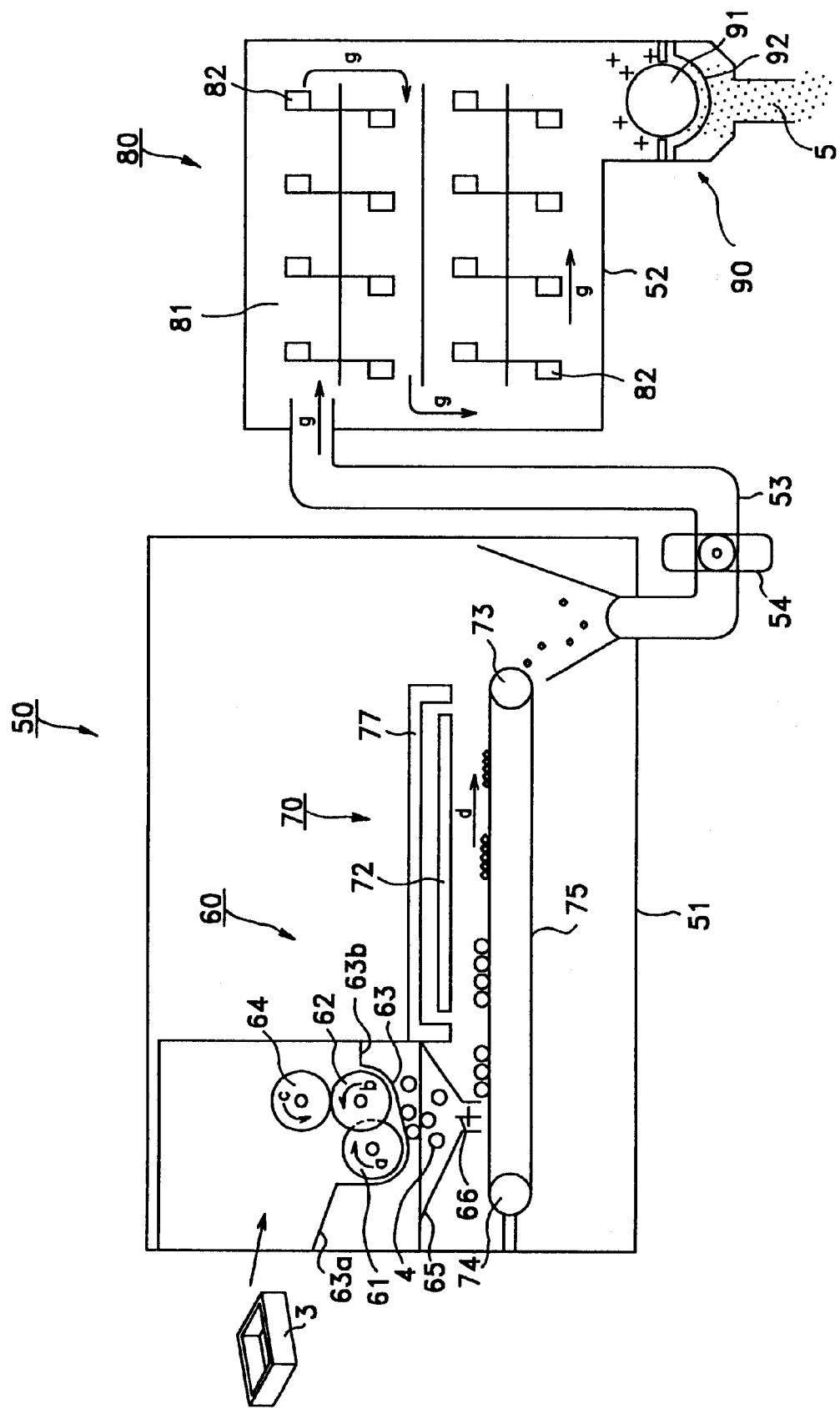
FIG. 4 is a schematic view showing a two-segment type expanded styrene processing apparatus according to the present invention.

Referring to FIG. 4, the two-segment type processing apparatus for expanded styrene 50 includes a first processor 51, having a first-order comminuting unit 60 for comminuting the unneeded expanded styrene 3 and a heating unit 70 for heating the expanded styrene already subjected to first-order comminution (first-order comminuted article 4) by illuminating the far-infra-red light thereon, and a second processor 52, having a cooling unit 80 for cooling the first-order comminuted article 4 reduced in volume on heating, and a second-order comminuting unit 90 for further comminuting the cooled first-order comminuted article 4 for producing the granulated second-order comminuted article 5 having uniform size and shape.

In this two-segment type processing apparatus for expanded styrene 50, the first-order comminuted article 4, processed with first-order comminution and heating by the first processor 51, is routed by a transport blower 54 via a transport tube 53 to the second processor 52 where the article is cooled and subjected to second-order comminution to give the granulated second-order comminuted article 5.

Similarly to the first-order comminuting unit 10 of the unitary processing apparatus 1 for expanded styrene, described previously, the first-order comminuting unit 60 includes a pair of comminution rolls 61, 62, as comminution means for comminuting the expanded styrene 3 charged into the first processor 51 of the processing apparatus for expanded styrene 50, a first filter 63 for sorting the first-order comminuted article 4 from the paired comminution rolls 61, 62 to permit only the first-order comminuted article 4 of the size less than a pre-set size to be passed therethrough, a scraper roll 64 for scraping the first-order comminuted article 4 not larger than a pre-set size to inject it into a space between the paired comminution rolls 61, 62 and a gate 65 for routing the first-order comminuted article 4 sorted by the first filter 63 quantitatively to the heating uni 70. The first-order comminuting unit 60 also includes a paddler 66 for stirring the first-order comminuted article 4 in the gate 65 to prevent accumulation of the first-order comminuted article 4 passed through the first filter 63.

The various components of the first-order comminuting unit 60 are similar to those of the first-order comminuting unit 10 of the unitary type processing apparatus for expanded styrene and hence are not explained specifically.

The first-order comminuted article 4 from the first-order comminuting unit 60 is quantitatively supplied to the heating unit 70.

Similarly to the heating unit 20 of the above-described unitary type processing apparatus for expanded styrene, the heating unit 70 includes a conveyor 75 for transporting the first-order comminuted article 4 from the first-order comminuting unit 60, and a far-infra-red heater 72 for illuminating the far-infra-red light to the first-order comminuted article 4 transported on the conveyor 75 to heat and reduce the volume of the transported article.

The respective components of the heating unit 70 are similar to those of the heating unit 20 of the above-described unitary type processing apparatus for expanded styrene, and hence are not explained specifically.

The first-order comminuted article 4, heated by the heating unit 70 and thereby reduced in volume, is supplied to the second processor 52 via a transporting tube 53. Within the first processor 51 is mounted a transport blower 54, whereby the first-order comminuted article 4 heated by the heating unit 70 is transported via the transport tube 53 to the second processor 52.

The cooling unit 80 includes a cooling channel 81, operating as a movement path for the first-order comminuted article 4 charged into the second processor 52 and plural stirring blades 82 provided at a pre-set interval in the cooling channel 81 for causing movement of the first-order comminuted article 4 in the cooling channel 81 under stirring to promote heat dissipation of the first-order comminuted article 4.

The stirring blades 82 are run in rotation slowly at an rpm of the order of 6 by a driving motor, not shown, to transport the first-order comminuted article 4 under stirring to promote heat dissipation of the first-order comminuted article 4 transported through the cooling channel 81.

The first-order comminuted article 4, cooled as it is transported through the cooling channel 81 under stirring by the stirring blades 82, is routed to a second-order comminution unit 90.

The second-order comminution unit 90 includes a comminution roll 91 for further comminuting the supplied first-order comminuted article 4, and a second filter 92 for sorting out the second-order comminuted article 5 pulverized by the comminution roll 91 to permit only the second-order comminuted article 5 of a size less than a pre-set value to pass therethrough.

Similarly to the comminuting roll 43 of the above-described unitary type processing apparatus 1 for expanded styrene, the comminution roll 91 includes a sole rotary blade and two stationary blades on both sides of the rotary blade. The comminution roll 91 is run in rotation by a driving motor, not shown, for further crushing the first-order comminuted article 4 transported through the cooling channel 81 to the second-order comminution unit 90 to produce the granulated second-order comminuted article 5.

Similar to the second filter 44 of the above-described unitary type processing apparatus 1 for expanded styrene, the second filter 92 is a metal plate including plural circular-shaped orifices, not shown, approximately 7 mm in diameter, the second filter 92 sorts out the second-order comminuted article 5 by permitting the passage of the second-order comminuted article 5 from the comminution roll 91 having the size not larger than the orifice size and by not permitting passage of the second-order comminuted article 5 from the comminution roll 91 having the size larger than the orifice size.

The granulated second-order comminuted article 5, passed through the second filter 92, is discharged outside of the second processor 52 so as to be used as a starting material for e.g., injection molding.

The operation of the above-described two-segment type processing apparatus for expanded styrene 50 is hereinafter explained.

First, the power source of the processing apparatus 50 is turned on, and unneeded expanded styrene 3 is charged into the first processor 51. The paired comminuting rolls 61, 62 operate for finely comminuting the expanded styrene 3.

The first-order comminuted article 4 from the paired comminuting rolls 61, 62, having a size not larger than the pre-set size, is transmitted through the first filter 63 so as to be extruded to the gate 65. For example, the first-order comminuted article 4 having the diameter not larger than 20 to 30 mm is passed through the filter 63 and extruded onto the gate 65.

The first-order comminuted article 4, extruded onto the gate 65, is agitated by the paddler 66, and supplied to the inchoate side of the conveyor 75, moving at a constant velocity, at a constant feed rate. The first-order comminuted article 4 having a size larger than a pre-set value is scraped by the scraper roll 64 so as to be re-comminuted by the paired comminuting rolls 61, 62.

The first-order comminuted article 4 supplied to the conveyor 75 is transported by the conveyor 75 and irradiated with the far-infra-red light by the far-infra-red heater 72 arranged on the transporting channel. The first-order comminuted article 4, thus illuminated by the far-infra-red light, undergoes internal heating, so that its expanded space is destructed and hence the first-order comminuted article 4 starts to be contracted. This first-order comminuted article 4 undergoes volumetric contraction, without decomposition on fusion, until the time it reaches the trailing end of the conveyor 75, so that the first-order comminuted article 4 without undergoing decomposition on fusion and is deformed in a coral shape.

The first-order comminuted article 4 deformed into the coral shape, descends from the trailing end of the conveyor 75 and is transported through the transporting tube 53 for 5travelling within the second processor 52.

The first-order comminuted article 4, travelling within the second processor 52, is moved as it is stirred by the stirring blades 82 to promote heat dissipation. For example, the first-order comminuted article 4, which has retained heat of the order of 120 to 130° C. at the time point of descent from the trailing end of the conveyor 75, is cooled to approximately 40° C. at the trailing end of the cooling channel 81. In the drawing, an arrow g indicates the path of movement of the first-order comminuted article 4 through the inside of the second processor 52.

The first-order comminuted article 4, cooled to approximately 40° C., descends from the trailing end of the cooling channel 81 and is further comminuted by the comminution roll 91 into the granulated second-order comminuted article 5.

The second-order comminuted article 5, comminuted by the comminution roll 91 to a size not larger than a pre-set size, is passed through the second filter 92 and discharged to outside the second processor 52. For example, the second-order comminuted article 5 having the size not larger than 7 mm is discharged to outside of the second processor 52.

With the two-segment type processing apparatus for expanded styrene 50, as described above, the unneeded expanded styrene 3 is processed with first-order comminution, then illuminated by the far-infra-red light for volumetric reduction and further processed with second-order comminution to produce the granulated second-order comminuted article 5. The second-order comminuted article 5, fabricated by this two-segment type processing apparatus for expanded styrene 50 by the process steps of first-order comminution, illumination by far-infra-red light and second-order comminution, presents a granular appearance having an averaged size and shape.

Similarly to the second-order comminuted article 5, prepared by the unitary type processing apparatus 1 for expanded styrene, the second-order comminuted article 5 prepared by the two-segment type processing apparatus for expanded styrene 50 is charged into, for example, an injection molding machine so as to be re-used as a starting material for injection molding.

The second-order comminuted article 5 can also be mixed as an ingredient into the concrete or mortar mixture so as to be re-used a lightweight construction material.

What is claimed is:

1. A method for re-using expanded styrene comprising:
   comminuting expanded styrene;
   sorting the comminuted expanded styrene by size;
   illuminating far-infra-red light to only a portion of the sorted comminuted expanded styrene that is smaller in size than a pre-set value to reduce the volume thereof;
   further comminuting the expanded styrene, which has been reduced in volume, to prepare a granulated material; and
   injection molding the granulated material to prepare a regenerated article.

2. The method of claim 1 further comprising:
   re-comminuting a portion of the comminuted expanded styrene that is larger than the pre-set value.

3. The method of claim 1, further comprising:
   cooling the expanded styrene, reduced in volume after illuminating the comminuted expanded styrene.

4. A method for re-using expanded styrene comprising:
   comminuting expanded styrene;
   illuminating far-infra-red light to the comminuted expanded styrene to reduce the volume thereof;
   further comminuting expanded styrene, reduced in volume, to prepare a granulated material;
   sorting the granulated material; and
   injection-molding only a portion of the sorted granulated material that is smaller than a pre-set value.

* * * * *